United States Patent [19]
Miura et al.

[11] Patent Number: 6,159,389
[45] Date of Patent: Dec. 12, 2000

[54] POLYETHER COPOLYMER AND CROSSLINKED SOLID POLYMER ELECTROLYTE

[75] Inventors: Katsuhito Miura; Masanori Yanagida; Hiroki Higobashi; Seiji Nakamura, all of Hyogo, Japan

[73] Assignee: Daiso Co., Ltd., Osaka, Japan

[21] Appl. No.: 09/265,802

[22] Filed: Mar. 10, 1999

[30] Foreign Application Priority Data

Mar. 24, 1998 [JP] Japan .................................. 10-075409

[51] Int. Cl.⁷ ....................................................... H01G 1/74
[52] U.S. Cl. ............................. 252/62.2; 528/27; 528/31; 528/419; 528/418; 429/188; 429/192; 429/122; 525/523; 525/474; 525/476; 522/100; 522/60; 522/62
[58] Field of Search ................................... 429/188, 122, 429/192; 252/62.2; 528/27, 31, 418, 419; 522/60, 62, 100; 525/476, 474, 523

[56] References Cited

U.S. PATENT DOCUMENTS

| | | | |
|---|---|---|---|
| 3,297,783 | 1/1967 | Bailey | 260/836 |
| 3,388,079 | 6/1968 | Vanderberrg | 260/2 |
| 4,243,774 | 1/1981 | Inagami et al. | 525/405 |
| 4,303,748 | 12/1981 | Armand et al. | 429/192 |
| 4,408,013 | 10/1983 | Barnhouse | 525/187 |
| 4,578,326 | 3/1986 | Armand et al. | 429/192 |
| 4,694,067 | 9/1987 | Maeda et al. | 528/393 |
| 4,711,950 | 12/1987 | Miura et al. | 528/509 |
| 4,758,483 | 7/1988 | Armand et al. | 429/192 |
| 4,818,644 | 4/1989 | Armand | 429/192 |
| 4,822,701 | 4/1989 | Ballard et al. | 429/192 |
| 5,162,174 | 11/1992 | Andrei et al. | 429/192 |
| 5,527,639 | 6/1996 | Noda et al. | 429/192 |
| 5,968,681 | 10/1999 | Miura et al. | 429/122 |

FOREIGN PATENT DOCUMENTS

| | | |
|---|---|---|
| 174 894 | 3/1986 | European Pat. Off. . |
| 222 586 | 5/1987 | European Pat. Off. . |
| 392 839 | 10/1990 | European Pat. Off. . |
| 62-169823 | 7/1987 | Japan . |
| 62-249361 | 10/1987 | Japan . |
| 63-154736 | 6/1988 | Japan . |
| 2-235957 | 9/1990 | Japan . |
| 2-295004 | 12/1990 | Japan . |
| 3-47833 | 2/1991 | Japan . |
| 3200864 | 9/1991 | Japan . |
| 3200865 | 9/1991 | Japan . |
| 4036347 | 2/1992 | Japan . |
| 4-68064 | 3/1992 | Japan . |
| 5-304051 | 11/1993 | Japan . |
| 7-324129 | 12/1995 | Japan . |

OTHER PUBLICATIONS

Chen Li–quan et al., "Effects of some factors on conductivities of polymer ionic conductors", Wuli Xucb–ao (Acta Physica Sinica), vol. 36, No. 1, pp. 60–66 (1987).

Ballard et al., "Ionic conductivity in Organic Solids Derived from Amorphous Macromolecules", Macromoleculels, 23, pp. 1256–1264, (1990).

Kono, et al., "Synthesis of Polymer Electrolytes Based on Poly[2–(2–methoxyethoxy)ethyl glycidyl ether] and Their High Ionic Conductivity", Polymers for Advanced Technologies, vol. 4, pp. 85–91, (1993).

Motogami et al., "A New Polymer Electrolyte Based on Polyglycidylether", Electrochimica Acta, vol. 37, No. 9, pp. 1725–1727m (1992).

Database WPI; Section Ch, Week 8307; Derwent Publications Ltd.; Class A25, AN 83–16165K; XP 002108217; JP 58 002344 (Osaka Soda KK); Jan. 7, 1983; Abstract.

Chemical Abstracts; vol. 124, No. 1; Feb. 19, 1996; Columbus, Ohio, US; Abstract No. 88911k; Semiconductive Fluoride Resins; XP002108216.

*Primary Examiner*—Margaret G. Moore
*Attorney, Agent, or Firm*—Foley & Lardner

[57] ABSTRACT

A polyether copolymer having a weight-average molecular weight of $10^4$ to $10^7$, comprising 5 to 40% by mol of a repeating unit derived from epichlorohydrin, 95 to 60% by mol of a repeating unit derived from ethylene oxide, and 0.001 to 15% by mol of a crosslinkable repeating unit derived from a reactive oxirane compound, gives a provide a crosslinked solid polymer electrolyte which is superior in processability, moldability, mechanical strength, flexibility and heat resistance, and has markedly improved ionic conductivity.

28 Claims, No Drawings

POLYETHER COPOLYMER AND CROSSLINKED SOLID POLYMER ELECTROLYTE

FIELD OF THE INVENTION

The present invention relates to a crosslinkable polyether copolymer, a crosslinked material of said copolymer, and a crosslinked solid polymer electrolyte. More particularly, the present invention relates to a crosslinked solid polymer electrolyte which is suitable as a material for electrochemical devices such as battery, capacitor, sensor, condenser and EC (electrochromic) device, and an antistatic agent for rubber and plastic materials.

RELATED ART

As an electrolyte constituting an electrochemical device such as a battery, a capacitor and a sensor, those in the form of a solution or a paste have hitherto been used in view of the ionic conductivity. However, the following problems are pointed out. That is, there is a fear of damage of an apparatus arising due to liquid leakage, and subminiaturization and thinning of the device are limited because a separator to be impregnated with an electrolyte solution is required. To the contrary, a solid electrolyte such as inorganic crystalline substance, inorganic glass and organic polymer substance is suggested. The organic polymer substance is generally superior in processability and moldability and the resultant solid electrolyte has good flexibility and bending processability and, furthermore, the design freedom of the device to be applied is high and, therefore, the development is expected. However, the organic polymer substance is inferior in ionic conductivity to other materials at present.

For example, a trial of containing a specific alkaline metal salt in an epichlorohydrin rubber and applying the resultant to an ionic conductive solid electrolyte has already been suggested ("Effect of some factors on conductivities of polymer ionic conductors", Chen Li-quan et al., Wuli Xucbao, Vol. 36, No. 1, pages 60–66 (1987)), however, improved ionic conductivity has further required. A trial of containing a specific alkaline metal salt in a mixture of an epichlorohydrin rubber and a low-molecular weight polyethylene glycol derivative and applying the resultant to a solid polymer electrolyte has been suggested in Japanese Patent Kokai Publication No. 235957/1990 including the present applicant, however, those having more excellent mechanical characteristics and ionic conductivity have been required. In the case of widely applying a solid polymer electrolyte to devices, those having sufficient mechanical strength and flexibility are required to prevent electrical continuity and breakage of devices.

SUMMARY OF THE INVENTION

The present inventors have found that, when using a copolymer obtained by combining epichlorohydrin, ethylene oxide and a crosslinkable oxirane compound, there can be obtained a solid electrolyte, which is superior in ionic conductivity and does not cause plastic deformation or flow even under high temperature, by formulating an electrolyte salt compound before or after crosslinking.

The present invention provides a polyether copolymer having a weight-average molecular weight of $10^4$ to $10^7$, comprising:

(A) 4 to 40% by mol of a repeating unit derived from a monomer represented by the formula (I):

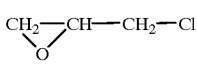

(B) 95 to 59% by mol of a repeating unit derived from a monomer represented by the formula (II):

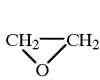

and
(C) 0.001 to 15% by mol of a repeating unit derived from a monomer represented by the formula (III-1) or (III-2):

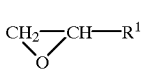

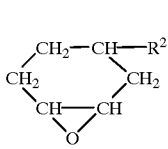

wherein $R^1$ and $R^2$ represent a substituent containing an ethylenically unsaturated group, a substituent containing a reactive silicon group, or a substituent containing an epoxy group at the end, which is represented by the formula (IV):

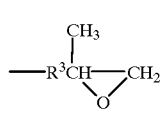

wherein $R^3$ is a divalent organic residue comprising at least one atom selected from carbon, oxygen and hydrogen atoms.

The present invention also provides
(1) a crosslinked material which is crosslinked by means of a reactivity of said copolymer,
(2) a solid polymer electrolyte obtained by mixing said copolymer (uncrosslinked polymer) with an electrolyte salt compound,
(3) a crosslinked solid polymer electrolyte comprising a crosslinked material of said copolymer obtained by utilizing a reactivity of said copolymer, and an electrolyte salt compound, and
(4) a battery comprising said crosslinked solid polymer electrolyte.

DETAILED DESCRIPTION OF THE INVENTION

The copolyer of the present invention has
(A) a repeating unit of the formula (I'):

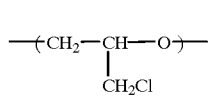

derived from the monomer (I), (B) a repeating unit of the formula (II'):

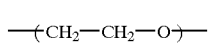
(II')

derived from the monomer (II), and (C) a repeating unit of the formula (III'-1) and/or (III'-2):

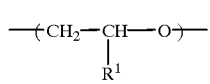
(III'-1)

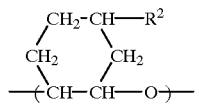
(III'-2)

derived from the monomer (III-1) and/or (III-2),
wherein $R^1$ and $R^2$ represent a substituent containing an ethylenically unsaturated group, a substituent containing a reactive silicon group, or a substituent containing an epoxy group at the end, which is represented by the formula (IV):

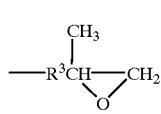
(IV)

wherein $R^3$ is a divalent organic residue comprising at least one atom selected from carbon, oxygen and hydrogen atoms.

A polymerization method for obtaining the polyether copolymer of the present invention is a polymerization method wherein a copolymer is obtained by a ring-opening reaction of the ethylene oxide portion, and is described in Japanese Patent Kokai Publication Nos. 169823/1987 and 324129/1995 filed by the present applicant. That is, the polyether copolymer can be obtained by reacting the respective monomers at the reaction temperature of 10 to 80° C. under stirring, using a catalyst mainly composed of an organoaluminum, a catalyst mainly composed of organozinc, an organotin-phosphoric ester condensate catalyst, etc. as a ring-opening catalyst in the presence or absence of a solvent. Particularly, in case where an oxirane compound having an epoxy group at only both ends is used, when using the organotin-phosphoric ester condensate catalyst, only an epoxy group which does not contain a substituent, i.e. methyl group is used in the polymerization reaction and, therefore, an epoxy group having a methyl group remains in the polymer without being reacted. The organotin-phosphoric ester condensate catalyst is particularly preferable in view of the polymerization degree, or properties of the resultant copolymer, etc.

As the polyether copolymer of the present invention used as a raw material for a crosslinked material, those comprising 4 to 40% by mol of the repeating unit (A), 95 to 59% by mol of the repeating unit (B) and 0.001 to 15% by mol of the repeating unit (C) are used. Those comprising 5 to 35% by mol, particularly 9 to 30% by mol, of the repeating unit (A), 64 to 94% by mol, particularly 69 to 90% by mol, of the repeating unit (B) and 0.01 to 10% by mol, particularly 0.1 to 10% by mol, of the repeating unit (C) are preferred.

When the content of the repeating unit (B) exceeds 95% by mol, crystallization of the oxyethylene chain arise and diffusion transfer of carrier ions are lowered, which results in drastic deterioration of the ionic conductivity of the solid electrolyte. When the content of the repeating unit (B) is smaller than 59% by mol, an increase in glass transition temperature arises, which results in deterioration of the dissociation capability of the salt and ionic conductivity.

It is generally known that the ionic conductivity is improved by deterioration of the crystallizability of polyethylene oxide and decrease in glass transition temperature. It has been found that, the effect for improvement of the ionic conductivity is remarkably large by an optimum balance of the monomeric composition of the polyether copolymer of the present invention.

When a molar ratio of the crosslinking monomer component (monomer capable of forming the repeating unit (C)) is larger than 15% by mol, the ionic conductivity is drastically lowered and the flexibility is lost in case of producing a film, thereby causing problems in processability and moldability.

The polyether copolymer of the present invention may be any of a block copolymer and a random copolymer. The random copolymer is more preferred because of its large effect of lowering the crystallizability of polyethylene oxide.

Regarding the molecular weight of the polyether copolymer, the weight-average molecular weight is within a range from $10^4$ to $10^7$, and preferably from $10^5$ to $5 \times 10^6$, so as to obtain excellent processability, moldability, mechanical strength and flexibility. When the weight-average molecular weight is smaller than $10^4$, it becomes necessary to increase the crosslink density to maintain the mechanical strength and to prevent flow at high temperature and, therefore, the ionic conductivity of the resultant electrolyte is lowered. On the other hand, when it exceeds $10^7$, problems arise in processability and moldability.

The repeating unit (A) is derived from epichlorohydrin. The repeating unit (B) is derived from ethylene oxide.

The monomer constituting the repeating unit (C) is an oxirane compound containing an ethylenically unsaturated group, an oxirane compound containing a reactive silicon group, or an oxirane compound containing an epoxy group at each of both ends.

In the case of the oxirane compound containing an epoxy group at both ends, $R^1$ in the monomer of the formula (III-1) is represented by the formula (IV) and $R^3$ is an organic residue comprising at least one atom selected from carbon, oxygen and hydrogen atoms.

The monomer having the ethylenically unsaturated group is preferably an oxirane compound represented by the formula (III-a):

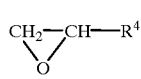
(III-a)

wherein $R^4$ is a group having an ethylenically unsaturated group.

As the ethylenically unsaturated group-containing oxirane compound, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3, 4-epoxy-1-butene, 3, 4-epoxy-1-pentene, 4, 5-epoxy-2-pentene, 1, 2-epoxy-5, 9-cyclododecadiene, 3, 4epoxy-1-vinylcyclohexene, 1, 2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene chains, oligoethylene glycol glycidyl ether methacrylate having 1 to 12 oxyethylene chains, oligoethylene glycol allyl glycidyl ether having 1 to 12 oxyethylene chains. Preferable examples thereof include allyl glycidyl ether, glycidyl acrylate and glycidyl methacrylate.

The monomer having a reactive silicon group, which constitutes the repeating unit (C), is preferably an oxirane compound represented by the formula (III-b-1):

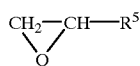

(III-b-1)

wherein $R^5$ is a reactive silicon-containing group, or the formula (III-b-2):

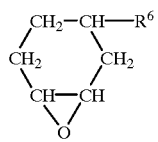

(III-b-2)

wherein $R^6$ is a reactive silicon-containing group.

The reactive silicon group-containing oxirane compound represented by the formula (III-b-1) is preferably a compound represented by the formula (III-b-1-1) or (III-b-1-2).

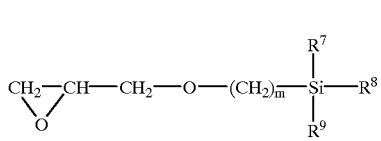

(III-b-1-1)

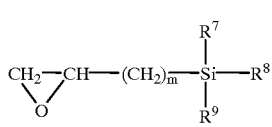

(III-b-1-2)

The reactive silicon group-containing monomer represented by the formula (III-b-2) is preferably a compound represented by the formula (III-b-2-1).

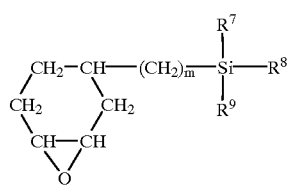

(III-b-2-1)

In the formulas (III-b-1-1), (III-b-1-2) and (III-b-2-1), $R^7$, $R^8$ and $R^9$ may be the same or different, but at least one of them represents an alkoxy group and the remainder represent an alkyl group; and m represents 1 to 6.

Examples of the monomer represented by the formula (III-b-1-1) include 1-glycidoxymethyltrimethoxysilane, 1-glycidoxymethylmethyldimethoxysilane, 2-glycidoxyethyltrimethoxysilane, 2-glycidoxyethylmethyldimethoxysilane, 3-glycidoxypropylmethyldimethoxysilane, 3-glycidoxypropyltrimethoxysilane, 4-glycidoxybutylmethyldimethoxysilane, 4-glycidoxybutyltrimethoxysilane, 6-glycidoxyhexylmethyldimethoxysilane and 6-glycidoxyhexyltrimethoxysilane.

Examples of the monomer represented by the formula (III-b-1-2) include 3-(1, 2-epoxy) propyltrimethoxysilane, 3-(1, 2-epoxy) propylmethyldimethoxysilane, 3-(1, 2-epoxy) propyldimethylmethoxysilane, 4-(1, 2-epoxy) butyltrimethoxysilane, 4-(1, 2-epoxy) butylmethyldimethoxysilane, 5-(1, 2-epoxy) pentyltrimethoxysilane, 5-(1, 2-epoxy) pentylmethyldimethoxysilane, 6-(1, 2-epoxy) hexyltrimethoxysilane and 6-(1, 2-epoxy) hexylmethyldimethoxysilane.

Examples of the monomer represented by the formula (III-b-2-1) include 1-(3, 4-epoxycyclohexyl) methyltrimethoxysilane, 1-(3, 4-epoxycyclohexyl) methylmethyl-dimethoxysilane, 2-(3, 4-epoxycyclohexyl) ethyltrimethoxysilane, 2-(3, 4-epoxycyclohexyl) ethylmethyldimethoxysilane, 3-(3, 4-epoxycyclohexyl) propyltrimethoxysilane, 3-(3, 4-epoxycyclohexyl) propylmethyldimethoxysilane, 4-(3, 4-epoxycyclohexyl) butyltrimethoxysilane and 4-(3, 4-epoxycyclohexyl) butyl-methyldimethoxysilane.

Among them, 3-glycidoxypropyltrimethoxysilane, 3-glycidoxypropyl-methyldimethoxysilane, 4-(1, 2-epoxy) butyltrimethoxysilane, 5-(1, 2-epoxy) pentyltrimethoxysilane and 2-(3, 4-epoxycyclohexyl) ethyltrimethoxysilane are particularly preferable.

The monomer having two epoxy groups at both ends, which constitutes the repeating unit (C), is preferably represented by the formula (III-c):

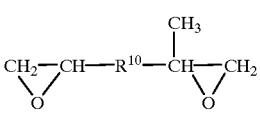

(III-c)

wherein $R^{10}$ is a divalent organic group. $R^{10}$ is preferably an organic group comprising elements selected from hydrogen, carbon and oxygen.

It is preferable that the group $R^{10}$ in the formula (III-c) is

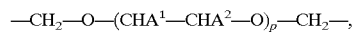

or

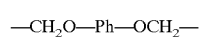

wherein $A^1$ and $A^2$ represent hydrogen or a methyl group; Ph represents a phenylene group; and p represents a numeral of 0 to 12.

The monomer having two epoxy groups at both ends is preferably a compound represented by the following formula (III-c-1), (III-c-2) or (III-c-3):

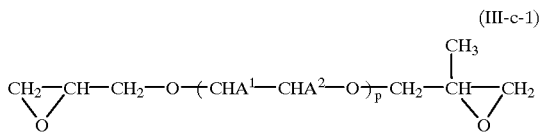

(III-c-1)

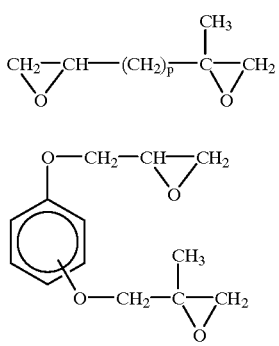

In the above formulas (III-c-1), (III-c-2) and (III-c-3), $A^1$ and $A^2$ represent hydrogen or a methyl group; and p represents a numeral of 0 to 12.

Examples of the monomer represented by the formula (III-c-1) include 2, 3-epoxypropyl-2', 3'-epoxy-2'-methyl propyl ether, ethylene glycol-2, 3-epoxypropyl-2', 3'-epoxy-2'-methyl propyl ether, and diethylene glycol-2, 3-epoxypropyl-2', 3'-epoxy-2'-methyl propyl ether. Examples of the monomer represented by the formula (III-c-2) include 2-methyl-1, 2, 3, 4-diepoxybutane, 2-methyl-1, 2, 4, 5-diepoxypenatane, and 2-methyl-1, 2, 5, 6-diepoxyhexane. Examples of the monomer represented by the formula (III-c-3) include hydroquinone-2, 3-epoxypropyl-2', 3'-epoxy-2'-methyl propyl ether, and catechol-2, 3-epoxypropyl-2', 3'-epoxy-2'-methyl propyl ether.

Among them, 2, 3-epoxypropyl-2', 3'-epoxy-2'-methyl propyl ether and ethylene glycol-2, 3-epoxypropyl-2', 3'-epoxy-2'-methyl propyl ether are particularly preferable.

In the crosslinking method of the copolymer wherein the reactive functional group is ethylenically unsaturated group, a radical initiator selected from an organic peroxide and an azo compound, or active energy ray such as ultraviolet ray and electron ray can be used. It is also possible to use a crosslinking agent having a silicon hydride.

As the organic peroxide, there can be used those which are normally used in the crosslinking, such as a ketone peroxide, a peroxy ketal, a hydroperoxide, a dialkyl peroxide, a diacyl peroxide and a peroxy ester. Specific examples of the organic peroxide include methyl ethyl ketone peroxide, cyclohexanone peroxide, 1, 1-bis(t-butylperoxy)-3, 3, 5-trimethylcyclohexane, 2, 2-bis(t-butylperoxy)octane, n-butyl-4,4-bis(t-butylperoxy)valerate, t-butyl hydroperoxide, cumene hydroperoxide, 2, 5-dimethylhexane-2, 5-dihydroperoxide, di-t-butyl peroxide, t-butylcumyl peroxide, dicumyl peroxide, α, α'-bis(t-butylperoxy-m-isopropyl)benzene, 2, 5-dimethyl-2, 5-di(t-butylperoxy)hexane, 2, 5-dimethyl-2, 5-di(t-butylperoxy)hexene, benzoylperoxide and t-butylperoxyisopropylcarbonate. The amount of the organic peroxide varies depending on the type of the organic peroxide, but it is normally within the range from 0.1 to 10% by weight based on the whole composition constituting the solid polymer electrolyte.

As the azo compound, there can be used those which are normally used in the crosslinking, such as an azonitrile compound, an azoamide compound and an azoamidine compound. Specific examples of the azo compound include 2, 2'-azobisisobutyronitrile, 2,2'-azobis (2-methylbutyronitrile), 2, 2'-azobis (4-methoxy-2, 4-dimethylvaleronitrile), 2, 2'-azobis(2, 4-dimethylvaleronitrile), 1, 1'-azobis (cyclohexane-1-carbonitrile), 2-(carbamoylazo) isobutyronitrile, 2-phenylazo-4-methoxy-2, 4-dimethyl-valeronitrile, 2, 2-azobis (2-methyl-N-phenylpropionamidine) dihydrochloride, 2, 2'-azobis [N-(4-chlorophenyl)-2-methylpropionamidine] dihydrochloride, 2, 2'-azobis [N-(hydroxyphenyl)-2-methylpropionamidine] dihydrochloride, 2, 2'-azobis [2-methyl-N-(phenylmethly) propionamidine] dihydrochloride, 2,2'-azobis [2-methyl-N-(2-propenyl) propionamidine] dihydrochloride, 2,2'-azobis (2-methylpropionamidine) dihydrochloride, 2, 2'-azobis [N-(2-hydroxyethyl)-2-methylpropionamidine] dihydrochloride, 2, 2'-azobis[2-(5-methyl-2-imidazolin-2-yl) propane] dihydrochloride, 2, 2'-azobis[2-(2-imidazolin-2-yl) propane] dihyrochloride, 2, 2'-azobis [2-(4,5,6,7-tetrahydro-1H-1,3-diazepin-2-yl) propane] dihydrochloride, 2, 2'-azobis [2-(3,4,5,6tetrahydropyrimidin-2-yl) propane] dihydrochloride, 2, 2'-azobis [2-(5-hydroxy-3,4,5,6-tetrahydropyrimidin-2-yl) propane] dihydrochloride, 2, 2'-azobis{2-[1-(2-hydroxyethyl)-2-imidazolin-2-yl] propane} dihydrochloride, 2, 2'-azobis [2-(2-imidazolin-2-yl) propane], 2, 2'-azobis {2-methyl-N-[1,1 -bis (hydroxymethyl)-2-hydroxyethyl] propionamide}, 2, 2'-azobis {2-methyl-N-[1,1-bis (hydroxymethyl) ethyl] propionamide}, 2, 2'-azobis [2-methyl-N-(2-hydroxyethyl) propionamide], 2,2'-azobis (2-methylpropionamide) dihydrate, 2, 2'-azobis (2,4,4-trimethylpentane), 2, 2'-azobis (2-methylpropane), dimethyl 2, 2'-azobisisobutyrate, 4, 4'-azobis (4-cyanovaleric acid) and 2,2'-azobis [2-(hydroxymethyl) propionitrile]. The amount of the azo compound varies depending on the type of the azo compound, but is normally within the range from 0.1 to 10% by weight based on the whole composition constituting the polymer solid electrolyte.

In the crosslinking due to radiation of activated energy ray such as ultraviolet ray, glycidyl acrylate, glycidyl methacrylate and glycidyl cinnamate are particularly preferable among the monomer component represented by the formula (III-c).

Furthermore, as the auxiliary sensitizer, there can be optionally used acetophenones such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy) phenyl-(2-hydroxy-2-propyl) ketone, 2,2-dimethoxy-1,2-diphenyl-ethan-1-one, 1-hydroxycyclohexyl-phenylketone and 2-methyl-2-morpholino (4-thio-methylphenyl) propan-1-one; benzoin ethers such as benzoin, benzoin methyl ether, benzoin ethyl ether, benzoin isopropyl ether and benzoin isobutyl ether; benzophenones such as benzophenone, methyl o-benzoyl benzoate, 4-phenylbenzophenone, hydroxy-benzophenone, 4-benzoyl-4'-methyl-diphenyl sulfide, alkylated benzophenone, 3, 3', 4, 4'-tetra (t-butylperoxycarbonyl) benzophenone, 4-benzoyl-N, N-dimethyl-N-[2-(1-oxo-2-propenyloxy) ethyl] benzenemethanaminium bromide and (4-benzoylbenzyl) trimethylammonium chloride; thioxanthones such as 2-isopropylthioxanthone, 2, 4-dimethylthioxanthone, 2, 4-diethylthioxanthone and 2, 4-dichlorothioxanthone; azides such as azidopyrene, 3-sulfonylazidobenzoic acid, 4-sulfonylazidobenzoic acid, 2, 6-bis(4'-azidobenzal)cyclohexanone-2, 2'-disulfonic acid (sodium salt), p-azidobenzaldehyde, p-azidoacetophenone, p-azidobenzoinic acid, p-azidobenzalacetophenone, p-azidobenzalacetone, 4, 4'-diazidochalcone, 1, 3-bis (4'-azidobenzal) acetone, 2, 6-bis (4'-azidobenzal)

cyclohexanone, 2, 6-bis(4-azidobenzal) 4-methylcyclohexanone, 4, 4'-diazidostilbene-2, 2'-disulfonic acid, 1,3-bis (4'-azidobenzal)-2-propanone-2'-sulfonic acid and 1,3-bis (4'-azidocinnacylidene)-2-propanone.

As a crosslinking aid, there can be optionally used ethylene glycol diacrylate, diethylene glycol diacrylate, triethylene glycol diacrylate, polyethylene glycol diacrylate, ethylene glycol dimethacrylate, diethylene glycol dimethacrylate, triethylene glycol dimethacrylate, polyethylene glycol dimethacrylate, oligoethylene glycol diacrylate, oligoethylene glycol dimethacrylate, propylene glycol diacrylate, propylene glycol dimethacrylate, oligopropylene glycol diacrylate, oligopropylene glycol dimethacrylate, 1, 3-butylene glycol diacrylate, 1, 4-butylene glycol diacrylate, 1, 3-glycerol dimethacrylate, 1, 1, 1-trimethylolpropane dimethacrylate, 1, 1, 1-trimethylolethane diacrylate, pentaerythritol trimethacrylate, 1, 2, 6-hexanetriacrylate, sorbitol pentamethacrylate, methylenebisacrylamide, methylenebismethacrylamide divinyl benzene, vinyl methacrylate, vinyl crotonate, vinyl acrylate, vinyl acetylene, trivinyl benzene, triallyl cyanyl sulfide, divinyl ether, divinyl sulfo ether, diallyl phthalate, glycerol trivinyl ether, allyl methacrylate, allyl acrylate, diallyl maleate, diallyl fumarate, diallyl itaconate, methyl methacrylate, butyl acrylate, ethyl acrylate, 2-ethylhexyl acrylate, lauryl methacrylate, ethylene glycol acrylate, triallyl isocyanurate, maleimide, phenylmaleimide, N,N-m-phenylenebismaleimide, p-quinonedioxime, maleic anhydride and itaconic acid.

As a crosslinking agent having a silicon hydride group, which is used for crosslinking the ethylenically unsaturated group, a compound having at least two silicon hydride groups can be used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

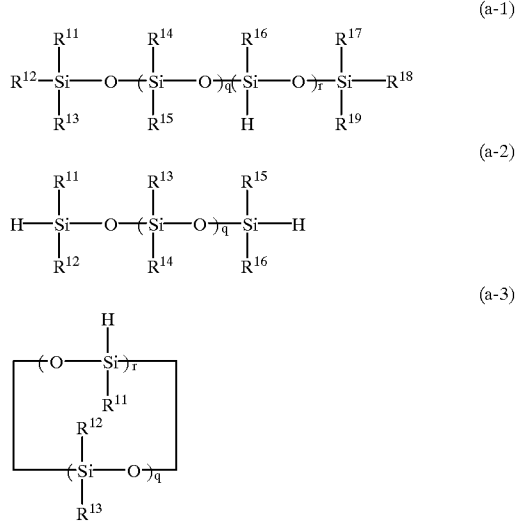

In the formulas (a-1) to (a-3), $R^{11}$, $R^{12}$, $R^{13}$, $R^{14}$, $R^{15}$, $R^{16}$, $R^{17}$, $R^{18}$ and $R^{19}$ respectively represent a hydrogen atom or an alkyl or alkoxy group having 1 to 12 carbon atoms; and q and r are an integer provided that $r \geq 2$, $q \geq 0, 2 \leq q+r \leq 300$. As the alkyl group, a lower alkyl group such as a methyl group and an ethyl group is preferable. As the alkoxy group, a lower alkoxy group such as a methoxy group and an ethoxy group is preferable.

As the polysilane compound, a linear polysilane compound represented by the formula (b-1) can be used.

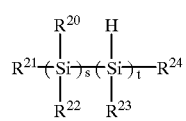

In the formula (b-1), $R^{20}$, $R^{21}$, $R^{22}$, $R^{23}$ and $R^{24}$ respectively represent a hydrogen atom or an alkyl or alkoxy group having 1 to 12 carbon atoms; and s and t are an integer provided that $t \geq 2$, $s \geq 0$, $2 \leq s+t \leq 100$.

Examples of the catalyst of the hydrosilylation reaction include transition metals such as palladium and platinum or a compound or complex thereof Furthermore, peroxide, amine and phosphine can also be used. The most popular catalyst includes dichlorobis(acetonitrile)palladium(II), chlorotris(triphenylphosphine)rhodium(I) and chloroplatinic acid.

As the crosslinking method of the copolymer wherein the reactive functional group is a reactive silicon group, the crosslinking can be conducted by the reaction between the reactive silicon group and water. In order to increase the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethylacetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

As the crosslinking method of the copolymer wherein the reactive functional group is an epoxy group, polyamines, acid anhydrides and the like can be used.

Examples of the polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4, 4'-diaminodiphenyl ether, diaminodiphenyl sulfone, m-phenylenediamine, 2, 4-toluylenediamine, m-toluylenediamine, o-toluylenediamine and xylylenediamine. The amount of the polyamine varies depending on the type of the polyamine, but is normally within the range from 0.1 to 10% by weight based on the whole composition constituting the solid polymer electrolyte.

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is normally within the range from 0.1 to 10% by weight based on the whole composition. In the crosslinking, an accelerator can be used. In the crosslinking reaction of polyamines, examples of the accelerator include phenol, cresol, resorcin, pyrogallol, nonyl phenol and 2, 4, 6-tris (dimethylaminomethyl)phenol. In the crosslinking reaction of the acid anhydride, examples of the accelerator include benzyldimethylamine, 2, 4, 6-tris(dimethylaminomethyl) phenol, 2-(dimethylaminoethyl)phenol, dimethylaniline and 2-ethyl-4-methylimidazole. The amount of the accelerator varies depending on the type of the accelerator, but is normally within the range from 0.1 to 10% by weight based on the crosslinking agent.

The electrolyte salt compound used in the present invention is preferably soluble in the polyether copolymer or in the crosslinked material of the polyether copolymer. In the present invention, the following electrolyte salt compounds are preferably used.

That is, examples thereof include a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7, 7, 8, 8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$, wherein $X^1$, $X^2$, $X^3$ and Y respectively represent an electron attractive group. Preferably, $X^1$, $X^2$ and $X^3$ independently represent a perfluoroalkyl having 1 to 6 carbon atoms or a perfluoroaryl group and Y represents a nitro group, a nitroso group, a carbonyl group, a carboxyl group or a cyano group. $X^1$, $X^2$ and $X^3$ may be the same or different.

As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the electrolyte salt compound is so that a numeral value of a molar ratio of the number of moles of the electrolyte salt compound to the total number of moles of ether oxygen atom in the main and side chains of the polyether copolymer (the total number of moles of ether oxygen atom included in the polyether copolymer) is preferably within the range from 0.0001 to 5, more preferably from 0.001 to 0.5. When this value exceeds 5, the processability and moldability, the mechanical strength and flexibility of the resultant solid electrolyte are deteriorated.

When the flame retardancy is required in using the polyether copolymer, the crosslinked material thereof and the solid polymer electrolyte, a flame retardant can be used. That is, an effective amount of those selected from a halide (such as a brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate as a flame retardant can be added.

The method for production of the crosslinked solid polymer electrolyte of the present invention is not specifically limited, but the crosslinked solid polymer electrolyte is normally produced by a method of mechanically mixing a polyether copolymer with an electrolyte salt compound or mixing after dissolving them in a solvent, removing the solvent, and crosslinking, or a method of crosslinking a polyether copolymer and mechanically mixing the crosslinked polyether copolymer with an electrolyte salt compound or mixing after dissolving them in a solvent and removing the solvent. As a means for mechanically mixing, various kneaders, open rolls, extruders, etc. can be optionally used. In case of producing the crosslinked solid polymer electrolyte by using the solvent, various polar solvents such as tetrahydrofuran, acetone, acetonitrile, dimethyl formamide, dimethyl sulfoxide, dioxane, methyl ethyl ketone, methyl isobutyl ketone, toluene and ethylene glycol diethyl ether may be used alone or in combination thereof. The concentration of the solution is preferably from 1 to 50% by weight, but is not limited thereto.

When the copolymer having an ethylenically unsaturated group is crosslinked by using a radical initiator, the crosslinking reaction is completed at the temperature range of 1 to 200° C. within 1 minute to 20 hours. When using energy radiation such as ultraviolet radiation, a sensitizer is normally used. The crosslinking reaction is normally completed at the temperature range of 10 to 150° C. within 0.1 second to 1 hour. In case of the crosslinking agent having silicon hydride, the crosslinking reaction is completed at the temperature of 10 to 180° C. within 10 minutes to 10 hours.

In case that the reactive functional group is a reactive silicon group, the amount of water used in the crosslinking reaction is not specifically limited because the crosslinking reaction easily occurs even in the presence of moisture in the atmosphere. The crosslinking can also be conducted by passing through a cold water or hot water bath for a short time, or exposing to a steam atmosphere.

When using a polyamine or an acid anhydride in the crosslinking reaction of the copolymer having an epoxy group, the crosslinking reaction is completed at the temperature of 10 to 200° C. within 10 minutes to 20 hours.

The copolymer and crosslinked material of said copolymer shown in the present invention become a precursor useful as a crosslinked solid polymer electrolyte. The solid polymer electrolyte shown in the present invention is superior in mechanical strength and flexibility, and a large area thin-film shaped solid electrolyte can be easily obtained by utilizing the properties. For example, it is possible to make a battery comprising the solid polymer electrolyte of the present invention. In this case, examples of the positive electrode material include lithium-manganese oxide, lithium-vanadium oxide, lithium cobaltate, lithium nickelate, cobalt-substituted lithium nickelate, vanadium pentaoxide, polyacene, polypyrene, polyaniline, polyphenylene, polyphenylene sulfide, polyphenylene oxide, polypyrrole, polyfuran, and polyazulene. Examples of the negative electrode material include an interlaminar compound prepared by occlusion of lithium between graphite or carbon layers, a lithium metal and a lithium-lead alloy. By utilizing the high ion conductivity, the crosslinked solid polymer electrolyte can also be used as a diaphragm of an ion electrode of the cation such as alkaline metal ion, Cu ion, Ca ion and Mg ion.

The solid polymer electrolyte of the present invention is especially suitable as a material for electrochemical device (e.g. a battery, a capacitor and a sensor).

PREFERRED EMBODIMENTS OF THE INVENTION

The following Examples further illustrate the present invention in detail. Preparation Example (production of catalyst)

Tributyltin chloride (10 g) and tributyl phosphate (35 g) were charged in a three-necked flask equipped with a stirrer, a thermometer and a distillation device, and the mixture was heated at 250° C. for 20 minutes with stirring under nitrogen stream and the distillate was distilled off to obtain a solid condensate as a residue product. In the following polymerization, this condensate was used as a polymerization catalyst.

The results of the composition analysis (in terms of monomer) of the polyether copolymer by elemental analysis, iodine value and $^1$H NMR spectrum were shown in Table 1 and Table 2. In case of the measurement of the molecular weight of the polyether copolymer, the gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column manufactured by Showa Denko K. K. such as Showdex KD-807, KD-806, KD-806M and KD-803, and a solvent DMF. The glass transition temperature and the heat of fusion were measured in a nitrogen atmosphere within a temperature range from −100 to 80° C. at a heating rate of 10° C./min., using a differential scanning calorimeter DSC8230B manufactured by Rigaku Denki K.K. The measurement of the conductivity σ cr was conducted as follows. That is, a film vacuum-dried at 20° C. under 1 mmHg for 72 hours was sandwiched between platinum electrodes and the conductivity was calculated according to the complex impedance method, using an A.C. method (voltage: 0.5 V, frequency: 5 Hz to 1 MHz). The flexibility of the solid electrolyte film was evaluated by the presence or absence of breakage in case of folding the film at an angle of 180 degrees at 25° C.

EXAMPLE 1

After the atmosphere in a four-necked glass flask (internal volume: 1 L) was replaced by nitrogen, the condensate (300 mg) obtained in the Preparation Example of the catalyst as the catalyst, allyl glycidyl ether (11 g) having a water content adjusted to not more than 10 ppm, epichlorohydrin (81 g) and n-hexane (500 g) as the solvent were charged in the flask, and ethylene oxide (100 g) was gradually added with monitoring the polymerization degree of epichlorohydrin by gas chromatography. The polymerization reaction was conducted at 20° C. for 20 hours. The polymerization reaction was terminated by using methanol. The polymer was isolated by decantation, dried at 40° C. under a normal pressure for 24 hours, and then dried at 45° C. under reduced pressure for 10 hours to give 185 g of a polymer. The glass transition temperature of this copolymer was −32° C., the weight-average molecular weight was 1,300,000 and the heat of fusion was 29 J/g. The component of epichlorohydrin was determined by elemental analysis of chlorine, whereas, the component of allyl glycidyl ether was determined by the measurement of the iodine value. The results of the composition analysis (in terms of monomers) are as shown in Table 1.

The resultant copolymer (1 g) and dicumyl peroxide (0.015 g) as a crosslinking agent were dissolved in acetonitrile (5 ml), and the resultant solution was mixed with lithium perchlorate (electrolyte salt compound) so that a molar ratio of (the number of mols of the electrolyte salt compound to the total number of moles of ether oxygen atoms of copolymer) was 0.05. This mixture solution was cast on a mold made of polytetarfluoroethylene, followed by sufficient drying and further heating under a nitrogen atmosphere at 150° C. for 3 hours to give a film. The measurement results of the conductivity and flexibility of the film are shown in Table 1.

EXAMPLE 2

Using the monomers shown in Table 1, the copolymerization was conducted by using the same catalyst and operation as those of Example 1. The resultant polyether copolymer (1 g), triethylene glycol dimethacrylate (0.05 g) and benzoyl oxide (0.015 g) as a crosslinking agent were dissolved in acetonitrile (20 ml), and the resultant solution was mixed with lithium bistrifluoromethanesulfonylimide (electrolyte salt compound) so that a molar ratio of (the number of moles of the electrolyte salt compound to the total number of moles of ether oxygen atoms of copolymer) was 0.05. This mixture solution was heated under a nitrogen atmosphere at 100° C. for 3 hours to give a film. The measurement results of the conductivity and flexibility of the film are shown in Table 1.

EXAMPLE 3

Using the monomers shown in Table 1, the copolymerization was conducted by using the same catalyst and operation as those of Example 1. The resultant polyether copolymer (1 g), triethylene glycol diacrylate (0.05 g) and 2,2-dimethoxy-1,2-diphenylethan-1-one (0.02 g) as a sensitizing agent were dissolved in acetonitrile (5 ml), and the resultant solution was mixed with lithium perchlorate (electrolyte salt compound) so that a molar ratio of (the number of mols of the electrolyte salt compound to the total number of moles of ether oxygen atoms of copolymer) was 0.05. This mixture solution was cast on a mold made of polytetrafluoroethylene, dried and then exposed to ultraviolet radiation (30 mW/cm$^2$, 360 nm) under an argon atmosphere at 50° C. for 10 minutes to give a film. The measurement results of the conductivity and flexibility of the film are shown in Table 1.

EXAMPLE 4

Using the monomers shown in Table 1, the copolymerization was conducted by using the same catalyst and operation as those of Example 1. The resultant polyether copolymer (1 g) and dibutyltin dilaurate (5 mg) as a catalyst were dissolved in tetrahydrofuran (20 ml) and water (10 μl) was added, followed by stirring for 15 minutes. After the solvent was removed under normal pressure, the mixture solution was dried at 60° C. for 10 hours to give a crosslinked material. The resultant crosslinked material was impregnated with a tetrahydrofuran solution (5 ml) containing lithium perchlorate (100 mg) for 20 hours, heated at 170° C. under 80 kgw/cm$^2$ for 10 minutes and pressurized to give a film. The measurement results of the conductivity and flexibility of the film are shown in Table 1.

EXAMPLE 5

Using the monomers shown in Table 1, the copolymerization was conducted by using the same catalyst and operation as those of Example 1. The resultant polyether copolymer (1 g) and maleic anhydride (150 mg) were dissolved in acetonitrile (10 ml), and the resultant solution was mixed with lithium perchlorate (electrolyte salt compound) so that a molar ratio of (the number of moles of the soluble electrolyte salt compound to the total number of moles of ether oxygen atoms of copolymer) was 0.05. This mixture solution was cast on a mold made of polytetrafluoroethylene, dried and then heated at 150° C. under 20 kgw/cm$^2$ for one hour and pressurized to give a film. The measurement results of the conductivity and flexibility of the film are shown in Table 1.

TABLE 1

Copolymer and solid polymer electrolyte

| | Example No. | | | | |
|---|---|---|---|---|---|
| | 1 | 2 | 3 | 4 | 5 |
| Charged monomer (% by mol) | | | | | |
| Ethylene oxide | 70 | 80 | 85 | 90 | 65 |
| Epichlorohydrin | 27 | 19 | 13 | 9.97 | 28 |
| Allyl glycidyl ether | 3 | 1 | | | |
| Glycidyl methacrylate | | | 2 | | |
| 3-glycidoxypropyltrimethoxysilane | | | | 0.03 | |
| 2,3-epoxypropyl-2',3'-epoxy-2'-methyl propyl ether | | | | | 7 |
| Composition of produced polymer (% by mol) | | | | | |
| Ethylene oxide | 72 | 81 | 87 | 92.3 | 67 |
| Epichlorohydrin | 25 | 18 | 11 | 7.67 | 26 |
| Allyl glycidyl ether | 3 | 1 | | | |
| Glycidyl methacrylate | | | 2 | | |
| 3-glycidoxypropyltrimethoxysilane | | | | 0.03 | |
| 2,3-epoxypropyl-2',3'-epoxy-2'-methyl propyl ether | | | | | 7 |
| Weight-average molecular weight of copolymer | 1,300,000 | 1,900,000 | 2,100,000 | 3,520,000 | 760,000 |
| Glass transition temperature of copolymer (° C.) | −32 | −53 | −54 | −55 | −51 |
| Heat of fusion of copolymer (J/g) | 29 | 32 | 35 | 49 | 19 |
| Flexibility of solid electrolyte film | Not broken | Not broken | Not broken | Not broken | Not broken |
| Conductivity of solid electrolyte film (S/cm) | | | | | |
| 30° C. | $2.2 \times 10^{-6}$ | $3.1 \times 10^{-5}$ | $1.8 \times 10^{-5}$ | $8.7 \times 10^{-6}$ | $1.5 \times 10^{-6}$ |

COMPARATIVE EXAMPLES 1 TO 4

The polyether copolymer shown in Table 2 was obtained in the same manner as in Example 1.

In Comparative Examples 1 and 2, a film was molded in the same manner as in Example 1, except for adding no crosslinking agent. In Comparative Example 3, a film was molded in the same manner as in Example 1. In Comparative Example 4, a film was molded in the same manner as in Example 4. The results are shown in Table 2.

EXAMPLE 6

(1) Production of cathode (positive electrode)

$LiCoO_2$ powder (10 g), graphite (KS-15) (7.5 g), the copolymer obtained in Example 1 (7.5 g), dicumyl peroxide (0.025 g), $LiBF_4$ (0.65 g) and acetonitrile (50 ml) were mixed under stirring by using a disperser to prepare a paste. This paste was coated on an aluminum foil and then dried to adhere a cathode material on the aluminum foil. Then, the cathode meterial was crosslinked by heating at 150° C. for 3 hours in a drier having atmosphere replaced by nitrogen.

TABLE 2

Copolymer and solid polymer electrolyte

| | Comparative Example No. | | | |
|---|---|---|---|---|
| | 1 | 2 | 3 | 4 |
| Composition of produced copolymer (% by mol) | | | | |
| Ethylene oxide | 10 | 100 | 50 | 30 |
| Epichlorohydrin | 90 | | 48 | 69.9 |
| Allyl glycidyl ether | | | 2 | |
| 3-glycidoxypropyltrimethoxysilane | | | | 0.1 |
| Weight-average molecular weight of copolymer | 590,000 | 4,200,000 | 920,000 | 660,000 |
| Glass transition temperature of copolymer (° C.) | −27 | −57 | −46 | −38 |
| Heat of fusion of copolymer (J/g) | 57 | 179 | 5 | 28 |
| Flexibility of solid electrolyte film | Broken | Broken | Not broken | Not broken |
| Conductivity of solid electrolyte film (S/cm) | | | | |
| 30° C. | $5.7 \times 10^{-9}$ | $1.1 \times 10^{-7}$ | $2.3 \times 10^{-7}$ | $3.2 \times 10^{-8}$ |

It is apparent from a comparison of Examples with Comparative Examples that the ionic conductivity and mechanical characteristics of the crosslinked solid polymer electrolyte formed from the polyether copolymer of the present invention are excellent.

(2) Assembling of battery

A battery was assembled by adhering an Li foil (diameter: 16 mm, thickness: 80 μm) to one main surface of a solid polymer electrolyte film made in Example 1 or 2 and then further the above cathode to the other main surface of the solid polymer electrolyte film. This operation was conducted in a glove box under a dry argon atmosphere.

(3) Charge/discharge test

The resultant battery was charged up to 4.2 V at a temperature of 50° C. and a current density of 0.1 mA²/cm, and discharged up to 3.0 V. In both cases of electrolyte films of Examples 1 and 2, a discharge capacity of 130 mAh per 1 g of $LiCoO_2$ as an active substance was obtained.

EFFECT OF THE INVENTION

The crosslinked solid polymer electrolyte of the present invention is superior in processability, moldability, mechanical strength, flexibility, heat resistance, etc., and the ionic conductivity is remarkably improved. Accordingly, the crosslinked solid polymer electrolyte of the present invention has an application to electronic apparatuses such as large-capacity condenser and display device (e.g. electrochromic display) including solid batteries, and an application to antistatic agent for plastic materials.

What is claimed is:

1. A polyether copolymer having a weight-average molecular weight of $10^4$ to $10^7$, comprising:

(A) 4 to 40% by mol of a repeating unit derived from a monomer represented by the formula (I):

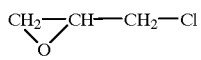
   (I)

(B) 95 to 59% by mol of a repeating unit derived from a monomer represented by the formula (II):

   (II)

and (C) 0.001 to 15% by mol of a repeating unit derived from a monomer represented by the formula (III-1) or (III-2):

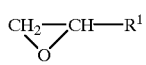
   (III-1)

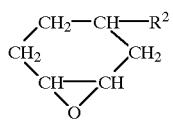
   (III-2)

wherein $R^1$ and $R^2$ represent a substituent containing an ethylenically unsaturated group, a substituent containing a reactive silicon group, or a substituent containing an epoxy group at the end, which is represented by the formula (IV):

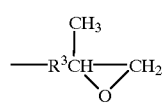
   (IV)

wherein $R^3$ is a divalent organic residue comprising at least one atom selected from carbon, oxygen and hydrogen atoms.

2. The polyether copolymer according to claim 1, wherein the weight-average molecular weight is within a range from $10^5$ to $5 \times 10^6$.

3. The polyether copolymer according to claim 1, which comprises 9 to 30% by mol of the repeating unit (A), 90 to 69% by mol of the repeating unit (b), and 0.01 to 10% by mol of the repeating unit (C).

4. The polyether copolymer according to claim 1, wherein the monomer constituting the repeating unit (C) is at least one crosslinking component selected from allyl glycidyl ether, allyl phenyl glycidyl ether, vinyl glycidyl ether, glycidyl acrylate, glycidyl methacrylate, glycidyl sorbate, glycidyl cinnamate and glycidyl crotonate.

5. The polyether copolymer according to claim 1, wherein the monomer constituting the repeating unit (C) is at least one compound selected from 3-glycidoxypropyltrimethoxysilane, 3-glycidoxypropylmethyldimethoxysilane, 4-(1,2-epoxy) butyltrimethoxysilane, 5-(1, 2-epoxy) pentyltrimethoxysilane and 2-(3,4-epoxycyclohexyl) ethyltrimethoxysilane.

6. The polyether copolymer according to claim 1, wherein the monomer constituting the repeating unit (C) is at least one compound selected from 2,3-epoxypropyl-2',3'-epoxy-2'-methyl propyl ether, ethylene glycol-2,3-epoxypropyl-2', 3°- epoxy-2'-methyl propyl ether, 2-methyl-1,2,3,4-diepoxybutane, 2-methyl-1,2,4,5-diepoxypentane, hydroquinone-2,3-epoxypropyl-2',3'-epoxy-2'-methyl propyl ether and catechol-2,3-epoxypropyl-2',3'-epoxy-2'-methyl propyl ether.

7. A crosslinked material obtained by utilizing reactivity of a crosslinking component of the polyether copolymer of claim 1.

8. A crosslinked material obtained by utilizing reactivity of an ethylenically unsaturated group of the polyether copolymer of claim 4.

9. A crosslinked material obtained by utilizing reactivity of a reactive silicon group of the polyether copolymer of claim 5.

10. A crosslinked material obtained by utilizing reactivity of a side chain epoxy group of the polyether copolymer of claim 6.

11. The crosslinked material according to claim 7, wherein the crosslinking utilizing reactivity of the ethylenically unsaturated group is the crosslinking by using a radical initiator selected from an organic peroxide and an azo compound, or the crosslinking by using an active energy radiation selected from ultraviolet radiation and electron radiation.

12. The crosslinked material according to claim 7, wherein the crosslinking utilizing reactivity of the ethylenically unsaturated group is the crosslinking by using a hydrosilylation reaction with a compound having at least two silicon hydride groups.

13. The crosslinked material according to claim 10, wherein the crosslinking utilizing reactivity of the side chain epoxy group is the crosslinking by using polyamines or acid anhydrides.

14. A crosslinked solid polymer electrolyte obtained by mixing a crosslinked material crosslinked by utilizing reactivity of a crosslinking monomer component of the polyether copolymer according to claim 7 with an electrolyte salt compound.

15. A crosslinked solid polymer electrolyte obtained by mixing a crosslinked material crosslinked by utilizing reactivity of an ethylenically unsaturated group of the polyether copolymer according to claim 8 with an electrolyte salt compound.

16. A crosslinked solid polymer electrolyte obtained by mixing a crosslinked material crosslinked by utilizing reactivity of a reactive silicon group of the polyether copolymer according to claim 9 with an electrolyte salt compound.

17. A crosslinked solid polymer electrolyte obtained by mixing a crosslinked material crosslinked by utilizing reactivity of a side chain epoxy group of the polyether copolymer according to claim 10 with an electrolyte salt compound.

18. A crosslinked solid polymer electrolyte obtained by crosslinking a mixture of the polyether copolymer of claim 1 and an electrolyte salt compound by means of reactivity of a crosslinking reactive group of the copolymer.

19. A crosslinked solid polymer electrolyte obtained by crosslinking a mixture of the polyether copolymer of claim 4 and an electrolyte salt compound by means of reactivity of an ethylenically unsaturated group of the copolymer.

20. A crosslinked solid polymer electrolyte obtained by crosslinking a mixture of the polyether copolymer of claim 5 and an electrolyte salt compound by means of reactivity of a reactive silicon group of the copolymer.

21. A crosslinked solid polymer electrolyte obtained by crosslinking a mixture of the polyether copolymer of claim 6 and an electrolyte salt compound by means of reactivity of a side chain epoxy group of the copolymer.

22. The crosslinked solid polymer electrolyte according to claim 14 wherein the electrolyte salt compound is a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$ (wherein $X^1$, $X^2$, $X^3$ and Y respectively represent an electron attractive group).

23. The crosslinked solid polymer electrolyte according to claim 22, wherein $X^1$, $X^2$ and $X^3$ independently represent a perfluoroalkyl group having 1 to 6 carbon atoms or a perfluoroaryl group having 6 to 20 carbon atoms, and Y represents a nitro group, a nitroso group, a carbonyl group, a carboxyl group or a cyano group.

24. The crosslinked solid polymer electrolyte according to claim 22, wherein the metal cation is a cation of a metal selected from Li, Na, K, Rb, Cs, Mg, Ca and Ba.

25. The crosslinked solid polymer electrolyte according to claim 22, wherein the metal cation is a cation of a transition metal.

26. The crosslinked solid polymer electrolyte according to claim 22, wherein the metal cation is a cation of a metal selected from Mn, Fe, Co, Ni, Cu, Zn and Ag.

27. The crosslinked solid polymer electrolyte according to claim 14 wherein the formulation ratio of the electrolyte salt compound to the polyether copolymer is so that a numeral value of a molar ratio of the number of moles of the electrolyte salt compound to the total number of moles of ether oxygen atoms in the polyether copolymer is from 0.0001 to 5.

28. A battery comprising the crosslinked solid polymer electrolyte of claim 14.

* * * * *